US012431074B2

(12) United States Patent
Zhang et al.

(10) Patent No.: US 12,431,074 B2
(45) Date of Patent: Sep. 30, 2025

(54) DRIVING METHOD AND APPARATUS OF DISPLAY PANEL, AND DISPLAY DEVICE

(71) Applicant: VISIONOX TECHNOLOGY INC., Jiangsu (CN)

(72) Inventors: Chunlei Zhang, Hefei (CN); Xiujian Zhu, Hefei (CN)

(73) Assignee: Visionox Technology Inc., Suzhou (CN)

( * ) Notice: Subject to any disclaimer, the term of this patent is extended or adjusted under 35 U.S.C. 154(b) by 0 days.

(21) Appl. No.: 18/758,349

(22) Filed: Jun. 28, 2024

(65) Prior Publication Data

US 2024/0355274 A1 Oct. 24, 2024

Related U.S. Application Data

(63) Continuation of application No. PCT/CN2024/083546, filed on Mar. 25, 2024.

(30) Foreign Application Priority Data

Apr. 9, 2023 (CN) ........................ 202310369652.1

(51) Int. Cl.
*G09G 3/30* (2006.01)
*G09G 3/32* (2016.01)

(52) U.S. Cl.
CPC ....... *G09G 3/32* (2013.01); *G09G 2320/0271* (2013.01); *G09G 2320/041* (2013.01); *G09G 2330/021* (2013.01); *G09G 2360/16* (2013.01)

(58) Field of Classification Search
CPC ................................................ G09G 3/30–321
See application file for complete search history.

(56) References Cited

U.S. PATENT DOCUMENTS

2018/0061304 A1* 3/2018 Wang .................. G09G 3/3611
2021/0065623 A1* 3/2021 Hong .................. G09G 3/3275
2024/0312398 A1* 9/2024 Luo ..................... G09G 3/2081
2024/0312405 A1* 9/2024 Zhou ................... G09G 3/3233

FOREIGN PATENT DOCUMENTS

CN 102737577 A 10/2012
CN 103177693 A 6/2013
CN 103971634 A 8/2014
(Continued)

OTHER PUBLICATIONS

International Search Report on Patentability issued on May 22, 2024, in corresponding International Application No. PCT/CN2024/083546, 8 pages.

*Primary Examiner* — Roy P Rabindranath
(74) *Attorney, Agent, or Firm* — Maier & Maier, PLLC

(57) ABSTRACT

A driving method and apparatus of a display panel, and a display device. The method includes the following: acquiring display data of a frame, where the display data includes grayscale values corresponding to subpixels emitting light having at least two colors; calculating a typical grayscale value corresponding to subpixels emitting light having each color according to the display data, where the typical grayscale value represents the overall grayscale level of the subpixels emitting light having each color, and determining a common supply voltage corresponding to the subpixels emitting light having each color according to the typical grayscale value.

19 Claims, 8 Drawing Sheets

(56) References Cited

FOREIGN PATENT DOCUMENTS

| | | | |
|---|---|---|---|
| CN | 104318903 | A | 1/2015 |
| CN | 106910461 | A | 6/2017 |
| CN | 113327541 | A | 8/2021 |
| CN | 113763861 | A | 12/2021 |
| CN | 114038391 | A | 2/2022 |
| CN | 114743471 | A | 7/2022 |
| CN | 113889035 | B | 11/2022 |
| CN | 110111731 | B | 12/2022 |

* cited by examiner

DRIVING METHOD AND APPARATUS OF DISPLAY PANEL, AND DISPLAY DEVICE

CROSS-REFERENCE TO RELATED APPLICATIONS

This is a continuation of International Patent Application No. PCT/CN2024/083546, filed Mar. 25, 2024, which claims priority to Chinese Patent Application No. 202310369652.1 filed with the China National Intellectual Property Administration (CNIPA) on Apr. 9, 2023, the disclosures of which are incorporated herein by reference in their entireties.

TECHNICAL FIELD

The present application relates to the field of display technology and, for example, a driving method and apparatus of a display panel, and a display device.

BACKGROUND

With the continuous development of display technology, people's requirements for display panels are increasingly higher. The display panel of a display device is the main power-consuming component in the display device, so a reduction in the power consumption of the display panel is of great importance for improving the standby time of the display device. However, the existing display panel still has a high power consumption.

SUMMARY

The present application provides a driving method and apparatus of a display panel, and a display device to save the power consumption of the display panel.

Embodiments of the present application provide a driving method of a display panel including the following: acquiring display data of one frame, where the display data includes grayscale values corresponding to subpixels emitting light having at least two colors; calculating a typical grayscale value, representing an overall grayscale level of the subpixels emitting light having each color, corresponding to subpixels emitting light having each color according to the display data; and determining a common supply voltage corresponding to the subpixels emitting light having each color according to the typical grayscale value.

The present application also provides a driving apparatus of a display panel to execute the driving method of any embodiment of the present application. The driving apparatus includes a display data acquisition module, a typical grayscale value calculation module, and a supply voltage determination module. The display data acquisition module is configured to acquire display data of a frame, where the display data includes grayscale values corresponding to subpixels emitting light having at least two colors. The typical grayscale value calculation module is configured to calculate the typical grayscale value corresponding to subpixels emitting light having each color according to the display data. The supply voltage determination module is configured to determine the common supply voltage corresponding to the subpixels emitting light having each color according to the typical grayscale value.

The present application also provides a display device. The display device includes a display panel, a mainboard, a display driver chip, and a power chip. The display driver chip is configured to receive display data of one frame sent by the mainboard, execute the driving method of the display panel of any embodiment of the present application, and generate a power control signal. The power chip is configured to receive the power control signal sent by the display driver chip and transmit a corresponding common supply voltage to the display panel.

According to embodiments of the present application, the typical grayscale value corresponding to subpixels emitting light having each color is calculated, and the common supply voltage corresponding to the subpixels emitting light having each color is determined according to the typical grayscale value, so that the common supply voltage corresponding to the subpixels emitting light having each color can be adjusted independently and dynamically. This configuration prevents the display panel from following the principle of "high" when the display panel is powered, thereby saving power consumption and improving product competitiveness.

DETAILED DESCRIPTION

Embodiments of the present application provide a driving method of a display panel. The method is applicable to a display panel using self-luminous elements, such as an organic light-emitting diode (OLED) display panel, a microLED display panel, or a miniLED display panel. The driving method is executed by a driving apparatus of the display panel. The driving apparatus may be implemented by software and/or hardware.

Figure 1:
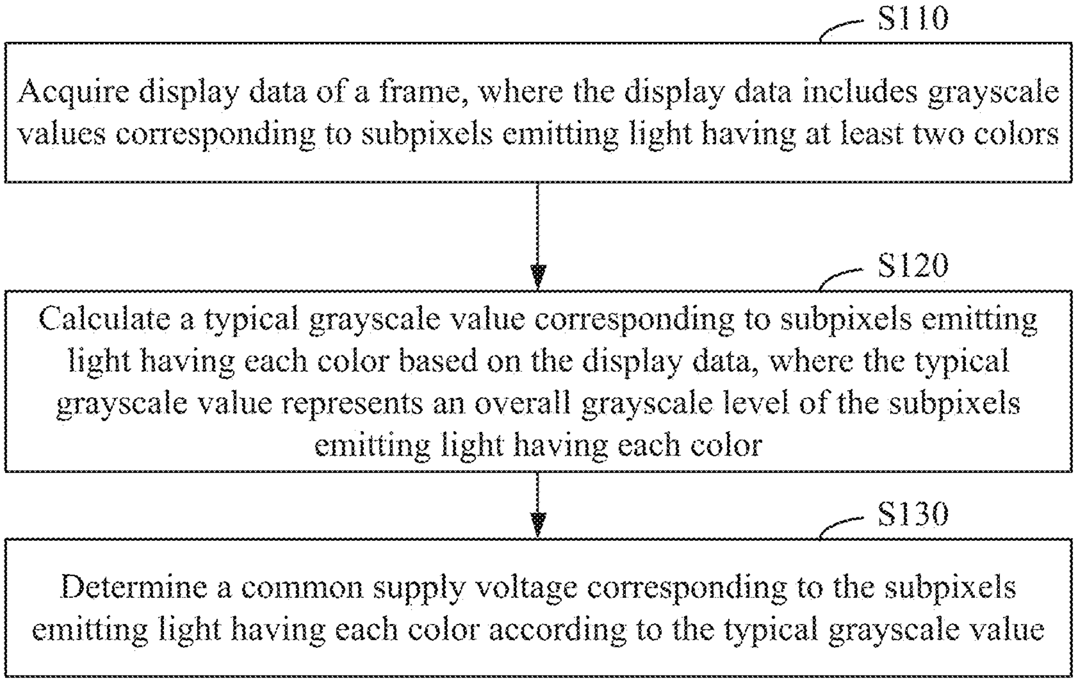
FIG. 1 is a flowchart of a driving method of a display panel according to embodiments of the present application.

FIG. 1 is a flowchart of a driving method of a display panel according to embodiments of the present application. Referring to FIG. 1, the driving method includes S110, S120, and S130.

In S110, display data of one frame is acquired. The display data includes grayscale values corresponding to subpixels emitting light having at least two colors.

Figure 2:
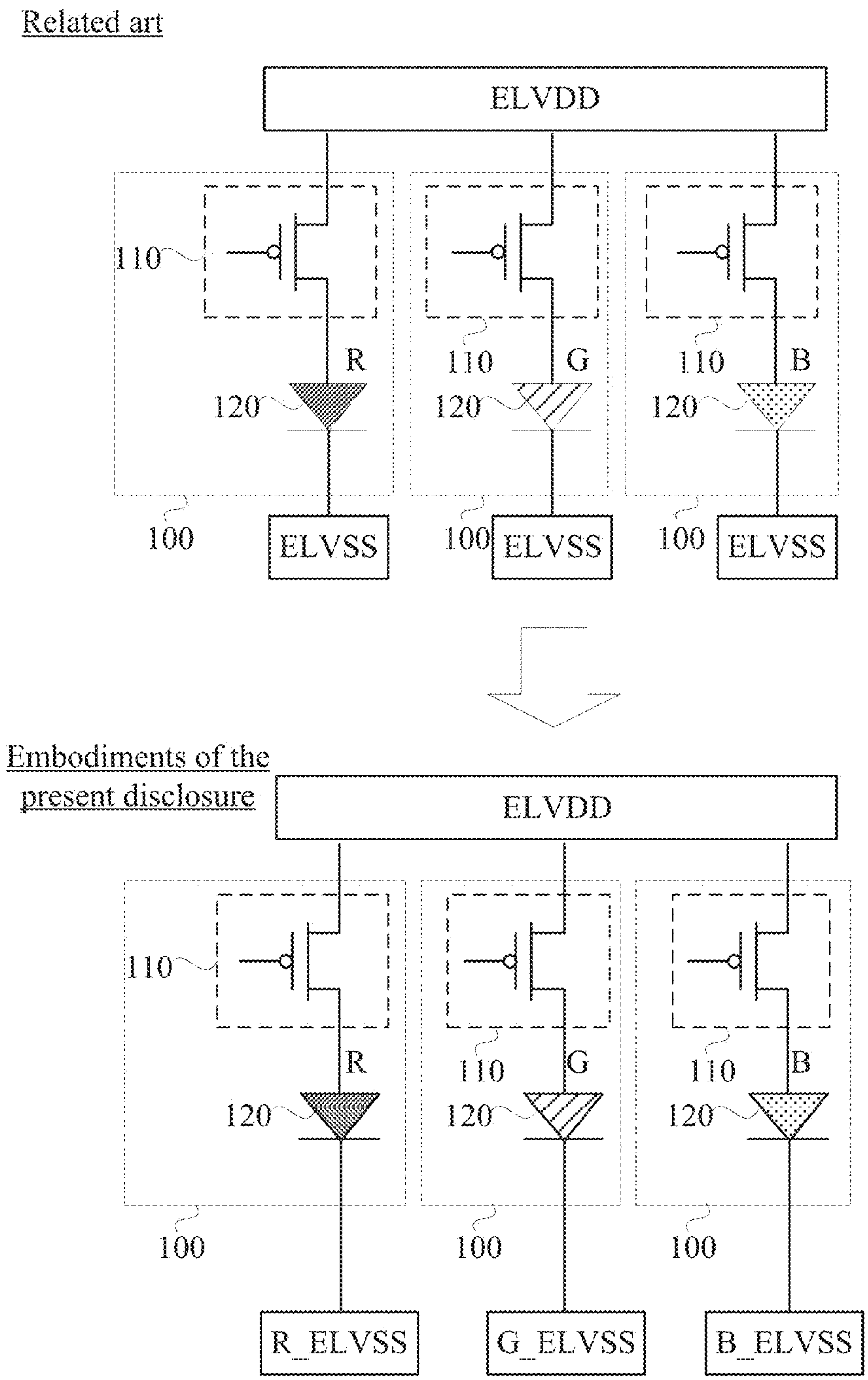
FIG. 2 is a circuit diagram of pixels in a display panel according to embodiments of the present application.

The grayscale value of a subpixel corresponds to the brightness of the subpixel. The higher the grayscale value, the larger the brightness of the light-emitting element. FIG. 2 is a circuit diagram of pixels in a display panel according to embodiments of the present application. Referring to FIG.

2, for example, in an OLED display panel, each pixel includes subpixels 100 emitting light having three colors, and each subpixel 100 includes a pixel driving circuit 110 and a light-emitting element 120. The higher the grayscale value, the larger the drive current generated by the pixel driving circuit 110, and the larger the brightness of the light-emitting element 120. The lower the grayscale value, the smaller the drive current generated by the pixel driving circuit 110, and the smaller the brightness of the light-emitting element 120.

For example, the subpixels 100 emitting light having the three colors include red subpixels R, green subpixels G, and blue subpixels B, and the display data includes a grayscale value corresponding to each red subpixel, a grayscale value corresponding to each green subpixel, and a grayscale value corresponding to each blue subpixel.

In S120, a typical grayscale value corresponding to subpixels emitting light having each color is calculated according to the display data.

The typical grayscale value represents the overall grayscale level of the subpixels emitting light having each color. Illustratively, the typical grayscale value may be the maximum grayscale value, an arithmetic mean value, a weighted mean grayscale value, a median grayscale value, or a mode grayscale value. The weighted mean grayscale value is an average pixel level (APL).

In S130, a common supply voltage corresponding to the subpixels emitting light having each color is determined according to the typical grayscale value.

The common supply voltage refers to a supply voltage shared by a plurality of subpixels. The common supply voltage in embodiments of the present application is different from that of the related art. For example, in FIG. 2, the brightness and the power consumption of a light-emitting element 120 are both related to the current flowing through the light-emitting element 120 and voltages at two terminals of the light-emitting element 120. A first power supply voltage (for example, a positive voltage ELVDD) and a second power supply voltage (for example, a negative voltage ELVSS) supply voltages to the pixel driving circuit 110 and the light-emitting element 120 respectively. Illustratively, the positive voltage ELVDD is supplied to the anode of the light-emitting element 120 through the pixel driving circuit 110, and the negative voltage ELVSS is directly supplied to the cathode of the light-emitting element 120. Light-emitting elements 120 emitting light having different colors use light-emitting materials emitting light having different colors. Due to differences in the light-emitting materials of different colors, luminous efficiencies of the light-emitting elements 120 emitting light having different colors are different. However, in the existing art, all subpixels 100 in a display panel not only share a positive voltage ELVDD, but also share a negative voltage ELVSS. To ensure the display effect, the setting of the negative voltage ELVSS has to follow the principle of "high", that is, the absolute value of the negative voltage ELVSS is large enough to satisfy the maximum brightness requirement of all subpixels 100. This "raises" the power consumption of the display panel to a certain extent, thus reducing product competitiveness.

In embodiments of the present application, not all subpixels 100 in the display panel share a positive voltage ELVDD or a negative voltage ELVSS. Only subpixels 100 emitting light having the same color share a positive voltage ELVDD or a negative voltage ELVSS. Subpixels 100 emitting light having different colors no longer share a positive voltage ELVDD or a negative voltage ELVSS. For example, in FIG. 2, all subpixels 100 in the display panel share a positive voltage ELVDD, and negative voltages ELVSS of subpixels 100 emitting light having different colors are different. For example, the negative voltage of each red subpixel R is R_ELVSS, the negative voltage of each green subpixel G is G_ELVSS, and the negative voltage of each blue subpixel B is B_ELVSS. For example, when the typical grayscale value of subpixels 100 emitting light having one color is low, the common supply voltage of these subpixels 100 may be adjusted to a lower value; and when the typical grayscale value of subpixels 100 emitting light having another color is high, the common supply voltage of these subpixels 100 may be adjusted to a higher value. For another example, when the typical grayscale values of subpixels 100 emitting light having two colors are basically the same, it is feasible to adjust the common supply voltages of the subpixels 100 emitting light having these two colors according to the luminous efficiencies of their respective light-emitting elements 120.

In conclusion, according to this embodiment of the present application, the typical grayscale value corresponding to subpixels 100 emitting light having each color is calculated, and the common supply voltage corresponding to the subpixels 100 emitting light having each color is determined according to the typical grayscale value, so the common supply voltage corresponding to the subpixels 100 emitting light having each color can be adjusted independently and dynamically. This configuration prevents the display panel from following the principle of "high" when the display panel is powered, thereby saving the power consumption and improving the product competitiveness.

In the preceding embodiments, S130 of determining the common supply voltage corresponding to the subpixels emitting light having each color according to the typical grayscale value may be performed in a plurality of manners. Some of the manners are described below. These manners do not limit the present application.

Figure 3:
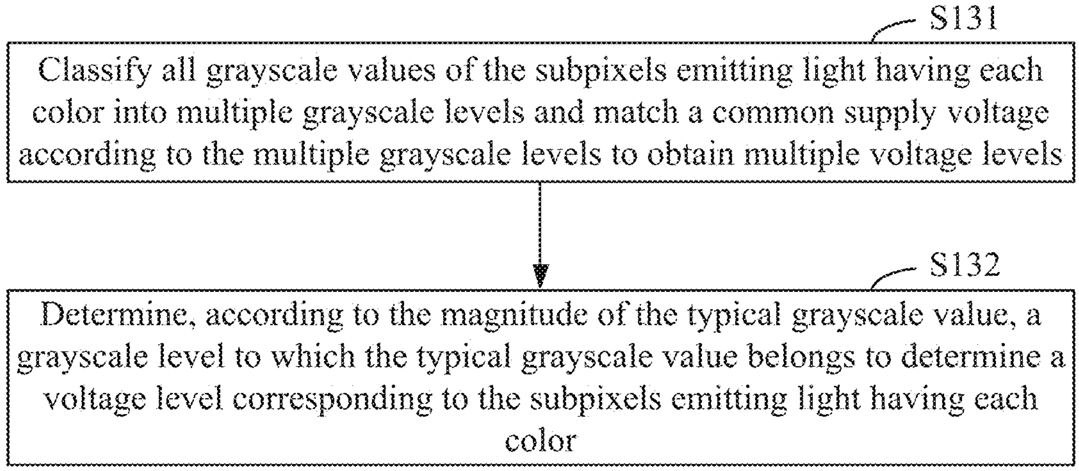
FIG. 3 is a flowchart of S130 according to embodiments of the present application.

FIG. 3 is a flowchart of S130 according to embodiments of the present application. Referring to FIG. 3, in an embodiment of the present application, alternatively, S130 includes S131 and S132.

In S131, all grayscale values of the subpixels emitting light having each color are classified into a plurality of grayscale levels, and a common supply voltage is matched according to the plurality of grayscale levels to obtain a plurality of voltage levels.

Both the grayscale levels and the voltage levels require to be differentiated according to the emitting colors of subpixels. Illustratively, the subpixels emitting light having different colors include first-color subpixels, second-color subpixels, and third-color subpixels. For example, the first-color subpixels are red subpixels, the second-color subpixels are green subpixels, and the third-color subpixels are blue subpixels.

When S131 is performed, all grayscale values of the first-color subpixels are classified into a plurality of first-color grayscale levels, and a common supply voltage is matched according to the plurality of first-color grayscale levels to obtain a plurality of first-color voltage levels; all grayscale values of the second-color subpixels are classified into a plurality of second-color grayscale levels, and a common supply voltage is matched according to the plurality of second-color grayscale levels to obtain a plurality of second-color voltage levels; and all grayscale values of the third-color subpixels are classified into a plurality of third-color grayscale levels, and a common supply voltage is matched according to the plurality of third-color grayscale levels to obtain a plurality of third-color voltage levels.

In S132, a grayscale level is determined according to the magnitude of the typical grayscale value so that the corresponding voltage level is determined. The typical grayscale value belongs to the grayscale level.

Both the grayscale levels and the voltage levels are differentiated according to the emitting colors of subpixels, so typical grayscale values of the subpixels are also differentiated according to the emitting colors of subpixels. Illustratively, the subpixels emitting light having different colors include first-color subpixels, second-color subpixels, and third-color subpixels. When S132 is performed, a first-color grayscale level is determined according to the magnitude of the typical grayscale value of the first-color subpixels so that a first-color voltage level corresponding to the first-color subpixels is determined, and the typical grayscale value of the first-color subpixels belongs to the first-color grayscale level; a second-color grayscale level is determined according to the magnitude of the typical grayscale value of the second-color subpixels so that a second-color voltage level corresponding to the second-color subpixels is determined, and the typical grayscale value of the second-color subpixels belongs to the second-color grayscale level; and a third-color grayscale level is determined according to the magnitude of the typical grayscale value of the third-color subpixels so that a third-color voltage level corresponding to the third-color subpixels is determined, and the typical grayscale value of the third-color subpixels belongs to the third-color grayscale level.

In this embodiment, the grayscale values and voltage levels corresponding to the subpixels of each color are obtained by classification, and then the grayscale level to which the typical grayscale value belongs is determined so that the voltage level corresponding to the subpixels of each color is determined. This configuration enables the common supply voltage corresponding to the subpixels of each color to be determined according to the typical grayscale value and can be implemented in a simple manner.

Grayscale levels and voltage levels corresponding to the subpixels emitting light having different colors are stored in grayscale-voltage tables, and the voltage level corresponding to subpixels emitting light having one color is determined in the following manner: The grayscale-voltage table is queried by using the typical grayscale value of the subpixels emitting light having the one color as an index.

Illustratively, the subpixels emitting light having different colors include first-color subpixels, second-color subpixels, and third-color subpixels. In this case, the grayscale-voltage table is configured to be queried for a first-color grayscale level and a first-color voltage level corresponding to the first-color subpixels, a second-color grayscale level and a second-color voltage level corresponding to the second-color subpixels, and a third-color grayscale level and a third-color voltage level corresponding to the third-color subpixels.

Table 1 is a grayscale-voltage table of this embodiment of the present application. Illustratively, the first-color subpixels are red subpixels R, the second-color subpixels are green subpixels G, and the third-color subpixels are blue subpixels B.

TABLE 1

| R/G/B LUT | R_LUT | R_ELVSS | G_LUT | G_ELVSS | B_LUT | B_ELVSS |
|---|---|---|---|---|---|---|
| 8 | Max R > R_LUT7 | R_ELVSS8 | Max G > G_LUT7 | G_ELVSS8 | Max B > B_LUT7 | B_ELVSS8 |
| 7 | R_LUT7 ≥ Max R > R_LUT6 | R_ELVSS7 | G_LUT7 ≥ Max G > G_LUT6 | G_ELVSS7 | B_LUT7 ≥ Max B > B_LUT6 | B_ELVSS7 |
| 6 | R_LUT6 ≥ Max R > R_LUT5 | R_ELVSS6 | G_LUT6 ≥ Max G > G_LUT5 | G_ELVSS6 | B_LUT6 ≥ Max B > B_LUT5 | B_ELVSS6 |
| 5 | R_LUT5 ≥ Max R > R_LUT4 | R_ELVSS5 | G_LUT5 ≥ Max G > G_LUT4 | G_ELVSS5 | B_LUT5 ≥ Max B > B_LUT4 | B_ELVSS5 |
| 4 | R_LUT4 ≥ Max R > R_LUT3 | R_ELVSS4 | G_LUT4 ≥ Max G > G_LUT3 | G_ELVSS4 | B_LUT4 ≥ Max B > B_LUT3 | B_ELVSS4 |
| 3 | R_LUT3 ≥ Max R > R_LUT2 | R_ELVSS3 | G_LUT3 ≥ Max G > G_LUT2 | G_ELVSS3 | B_LUT3 ≥ Max B > B_LUT2 | B_ELVSS3 |
| 2 | R_LUT2 ≥ Max R > R_LUT1 | R_ELVSS2 | G_LUT2 ≥ Max G > G_LUT1 | G_ELVSS2 | B_LUT2 ≥ Max B > B_LUT1 | B_ELVSS2 |
| 1 | R_LUT1 ≥ Max R > R_LUT0 | R_ELVSS1 | G_LUT1 ≥ Max G > G_LUT0 | G_ELVSS1 | B_LUT1 ≥ Max B > B_LUT0 | B_ELVSS1 |
| 0 | Max R ≤ R_LUT0 | R_ELVSS0 | Max G ≤ G_LUT0 | G_ELVSS0 | Max B ≤ B_LUT0 | B_ELVSS0 |

In Table 1, the first row lists headers of the table, R/G/B LUT indicates grayscale levels of three colors, R_LUT indicates the highest red grayscale at each red grayscale level, R_ELVSS indicates the red voltage level corresponding to each red grayscale level, G_LUT indicates the highest green grayscale at each green grayscale level, G_ELVSS indicates the green voltage level corresponding to each green grayscale level, B_LUT indicates the highest blue grayscale at each blue grayscale level, and B_ELVSS indicates the blue voltage level corresponding to each blue grayscale level. The column under each header lists the details about level classification.

Grayscales of the red subpixels R are classified into nine grayscale levels, that is, 0 to 8. R_LUT0 to R_LUT8 represent nine red grayscale levels respectively. Voltages of the red subpixels R are classified into nine red voltage levels: R_ELVSS0 to R_ELVSS8. The nine red grayscale levels are in one-to-one correspondence with the nine red voltage levels. The typical grayscale value of the red subpixels R is used as an index. For example, the typical grayscale value of the red subpixels R is the maximum grayscale value Max R. If Max R≤R_LUT0, the red subpixels R are at grayscale level 0 corresponding to red voltage level R_ELVSS0. Alternatively, R_ELVSS0 to R_ELVSS8 may also indicate a voltage value corresponding to a respective red voltage level.

The voltage level determination method of the green subpixels G and the blue subpixels B is similar to that of the red subpixels R and thus is not described here. It is to be noted that because light-emitting materials emitting light having different colors are different, the subpixels emitting light having different colors are different in terms of the grayscale level classification method and the value of the common supply voltage corresponding to each voltage level. In practical use, this may be configured according to the requirements.

It is to be understood that the more the grayscale levels (and voltage levels) obtained by classification, the more precise the finally-determined common supply voltage, and the larger the system memory occupied by the grayscale-voltage table; and the fewer the grayscale levels (and voltage levels), the less precise the finally-determined common supply voltage, and the smaller the system memory occupied by the grayscale-voltage table. In practical use, the number of the grayscale levels (and voltage levels) obtained by classification may be determined according to the requirements.

A higher grayscale value corresponds to a higher grayscale level, the higher grayscale level corresponds to a higher voltage level, and the higher voltage level corresponds to a higher absolute value of a common supply voltage. For example, when the typical grayscale value of the red subpixels R is 5, the corresponding red grayscale level is 0, the corresponding red voltage level is R_ELVSS0, the corresponding common supply voltage ELVSS is-6 V, and the absolute value of the corresponding common supply voltage ELVSS is 6 V; and when the typical grayscale value of the red subpixels R is 22, the corresponding red grayscale level is 1, the corresponding red voltage level is R_ELVSS1, the corresponding common supply voltage ELVSS is-6.5 V, and the absolute value of the corresponding common supply voltage ELVSS is 6.5 V.

Based on the preceding embodiments, alternatively, the subpixels emitting light having different colors include red subpixels R, green subpixels G, and blue subpixels B. The subpixels emitting light having different colors have the same voltage level classification method, and at the same voltage level, for example, the voltage level of the subpixels emitting light having each color is 8, the common supply voltage of the red subpixels R is R_COM, the common supply voltage of the green subpixels G is G_COM, and the common supply voltage of the blue subpixels B is B_COM. |R_COM|≤|G_COM|≤|B_COM|. Because red, green, and blue light-emitting materials are different, the subpixels emitting light having the different colors have different luminous efficiencies. Through an adjustment of the magnitude of the positive voltage ELVDD or negative voltage ELVSS, the luminous efficiency of the subpixels emitting light having each color can be matched. It is found by the inventors that the common supply voltage of the subpixels emitting light having each color can be adjusted according to the relationship of |R_COM|≤|G_COM|≤ B_COM|, thereby satisfying the requirements of luminous efficiency and the requirements of low power consumption.

If the positive voltage ELVDD is the adjustable common supply voltage, absolute values are not required in the preceding relationship, that is, R_ELVDD≤G_ELVDD-≤B_ELVDD. If the negative voltage ELVSS is the adjustable common supply voltage, the actual common supply voltage relationship between the subpixels emitting light having different colors is R_ELVSS≥G_ELVSS≥B_ELVSS.

Based on the preceding embodiments, alternatively, the grayscales of the subpixels emitting light having each color are equally classified into grayscale levels, and then a suitable common supply voltage is matched to each grayscale level. For example, grayscales of 0-255 are classified into eight grayscale levels, and each grayscale level includes 32 consecutive grayscales, that is, grayscales of 0-31 belong to grayscale level 0, grayscales of 32-63 belong to grayscale level 1, . . . , and grayscales of 224-255 belong to grayscale level 7.

Alternatively, the grayscales of the subpixels emitting light having each color are unequally classified into grayscale levels, and then a suitable common supply voltage is matched to each grayscale level. For example, for low grayscales, one grayscale level includes a small number of grayscales; and for high grayscales, one grayscale level includes a large number of grayscales. This is because a low grayscale is more sensitive to a change in the supply voltage, and this configuration ensures a more precise supply voltage. In practical use, the preceding may be determined according to the relationship between grayscales and voltages.

In each preceding embodiment, S130 is described in terms of grayscale level and voltage level classification method, not limiting the present application.

Figure 4:
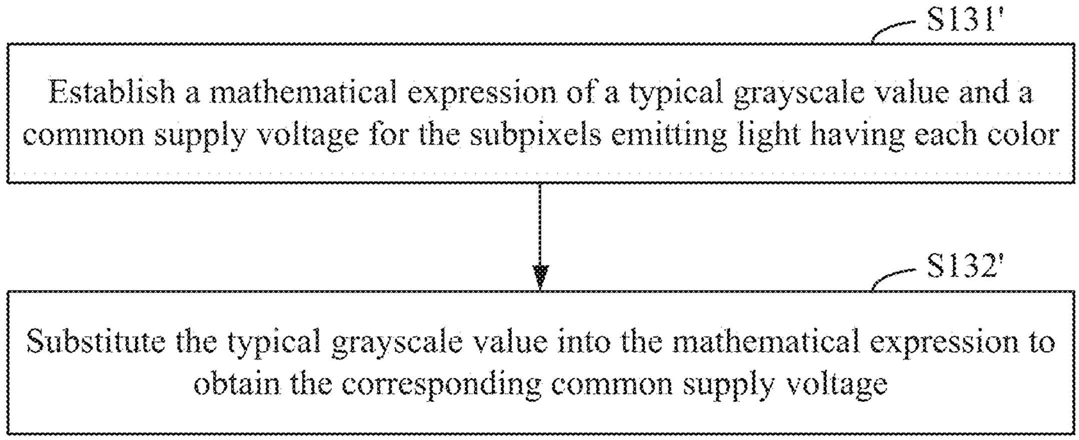
FIG. 4 is another flowchart of S130 according to embodiments of the present application.

FIG. 4 is another flowchart of S130 according to embodiments of the present application. Referring to FIG. 4, in another embodiment of the present application, alternatively, S130 includes S131' and S132'.

In S131', a mathematical expression of a typical grayscale value and a common supply voltage for subpixels emitting light having each color is established.

The typical grayscale value is an independent variable. The common supply voltage is a dependent variable. The mathematical expression may be a linear function, a non-linear function, or a piecewise function. Mathematical expressions of subpixels emitting light having different colors are different. An expression may be determined according to the relationship between grayscales and voltages.

In S132', the typical grayscale value is substituted into the mathematical expression to obtain the corresponding common supply voltage.

In this embodiment, for subpixels emitting light having each color, the mathematical expression of the typical grayscale value and the common supply voltage is established so that the corresponding common supply voltage is determined. This configuration enables the common supply voltage corresponding to the subpixels emitting light having each color to be determined according to the typical grayscale value. Different from the preceding embodiments, mathematical calculation is required in this embodiment and a large calculation amount is involved, but a more precise common supply voltage can be obtained.

Figure 5:
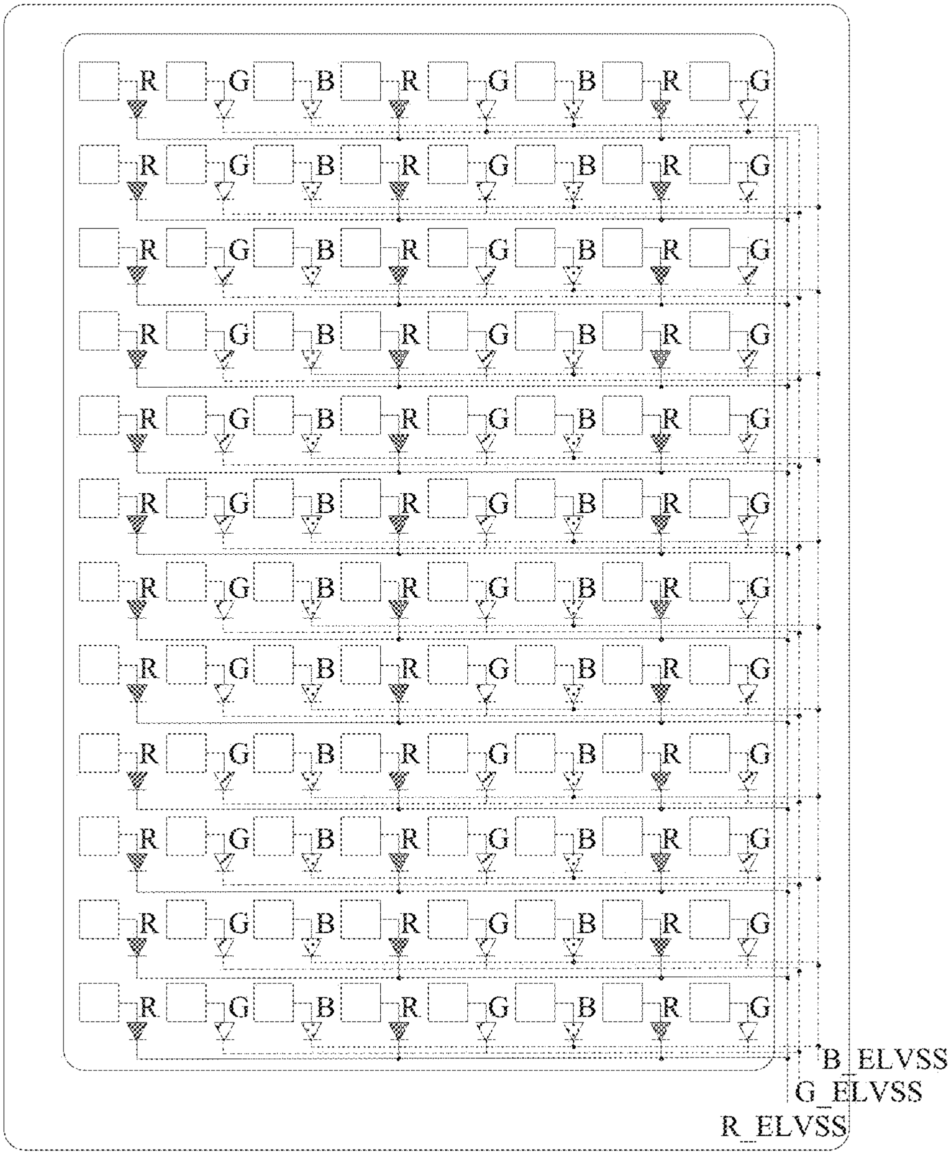
FIG. 5 is a power supply diagram of a display panel according to embodiments of the present application.

In the preceding embodiments, common supply voltages are distinguished by different emitting colors of the subpixels. FIG. 5 is a power supply diagram of a display panel according to embodiments of the present application. Referring to FIG. 5, illustratively, all red subpixels R share a negative voltage R_ELVSS, all green subpixels G share a negative voltage G_ELVSS, and all blue subpixels B share a negative voltage B_ELVSS.

Based on the preceding embodiments, a frame may be partitioned, and the scheme of each preceding embodiment is used in each partition.

Figure 6:
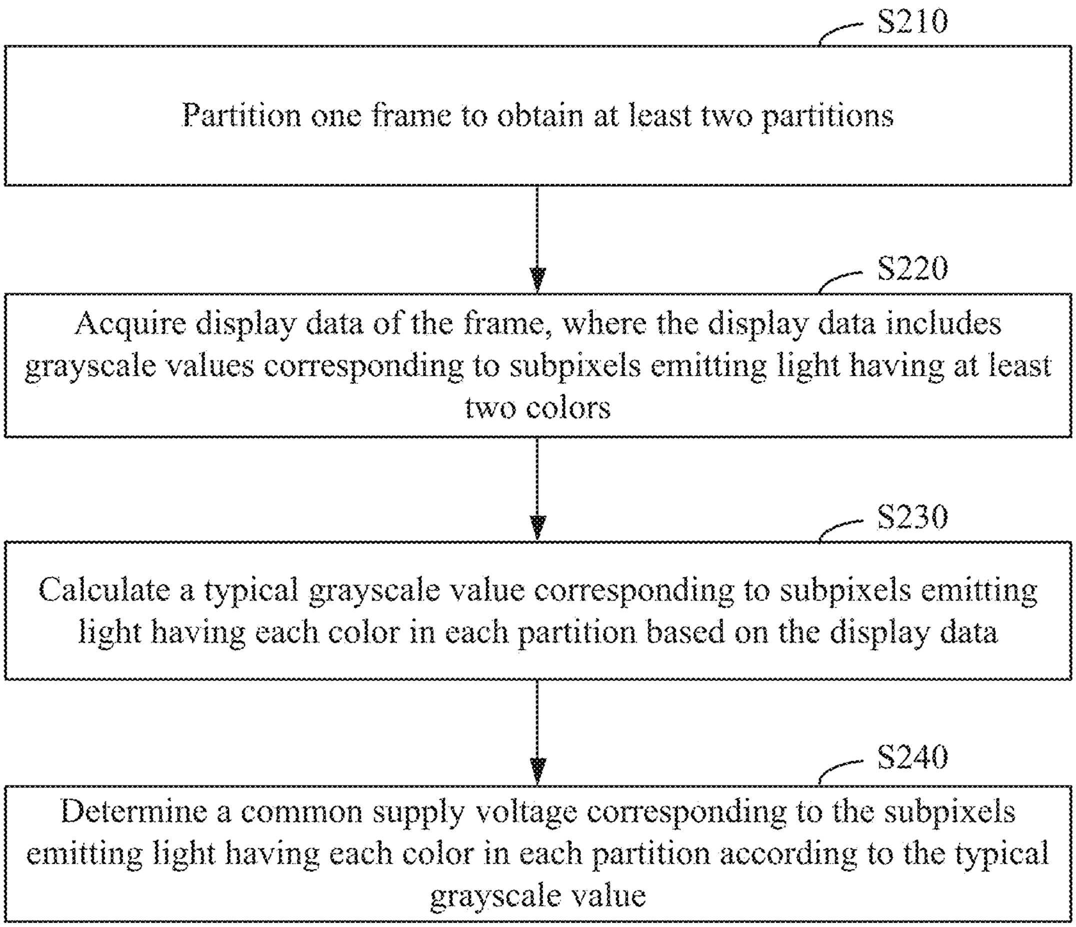
FIG. 6 is a flowchart of another driving method of the display panel according to embodiments of the present application.

FIG. 6 is a flowchart of another driving method of the display panel according to embodiments of the present application. Referring to FIG. 6, in an embodiment the present application, alternatively, the driving method includes S210, S220, S230, and S240.

In S210, one frame is partitioned to obtain at least two partitions.

Figure 7:
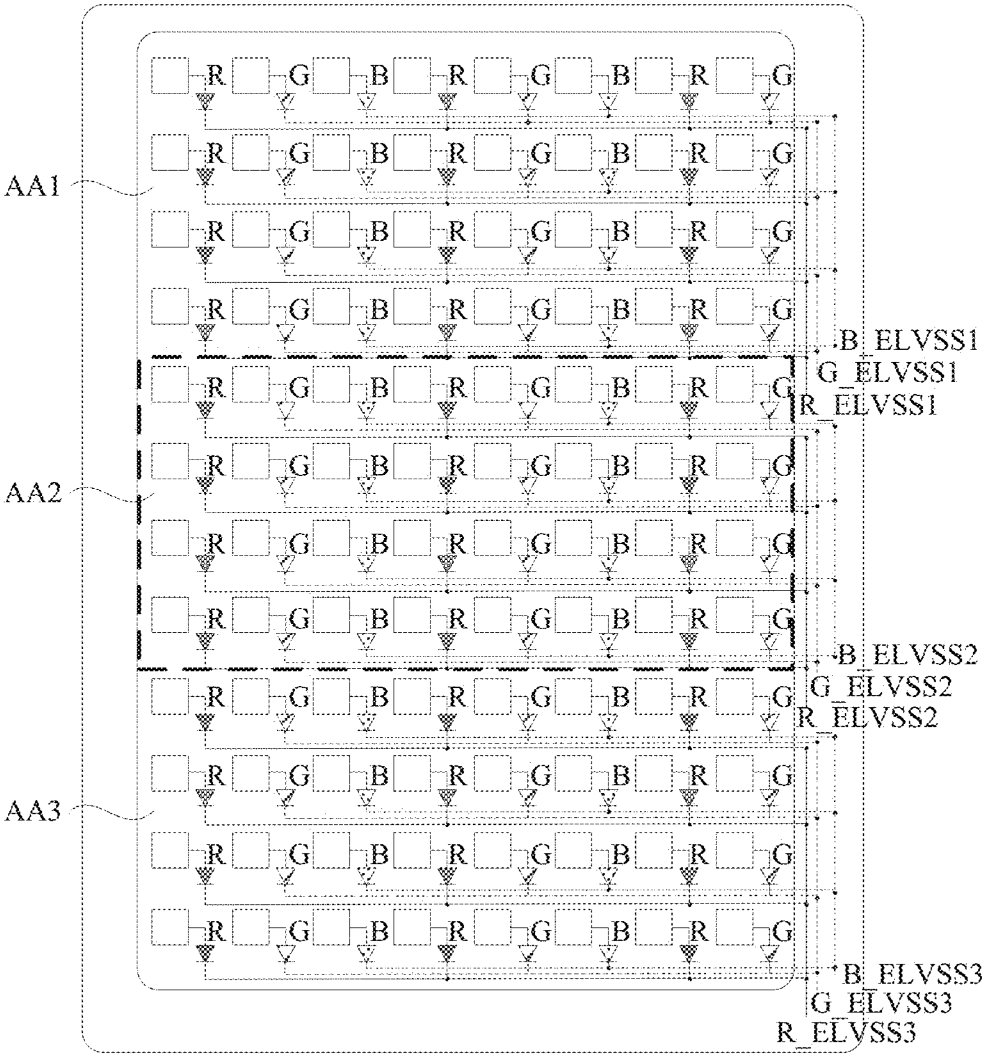
FIG. 7 is another power supply diagram of the display panel according to embodiments of the present application.

The methods of regional partition are varied. In terms of the number of partitions, the frame may be partitioned into two, three, or more partitions. In terms of the direction of partitioning, the frame may be partitioned in a vertical direction, a horizontal direction, or an arrayed manner. FIG. 7 is another power supply diagram of the display panel according to embodiments of the present application. Referring to FIG. 7, for example, one frame is partitioned into three partitions in a vertical direction, namely, partition AA1, partition AA2, and partition AA3.

Alternatively, fixed partitioning or dynamic partitioning may be performed. In the case of dynamic partitioning, the partitioning method may be adjusted according to different frame types. For example, when a video is watched, the played frames have different scale options under which the black regions have different widths. The partitions are adjusted to correspond to the black region, facilitating a precise control of the common supply voltage.

In S220, display data of the frame is acquired. The display data includes grayscale values corresponding to subpixels emitting light having at least two colors.

In S230, a typical grayscale value corresponding to subpixels emitting light having each color in each partition is calculated according to the display data.

Referring to FIG. 7, in partition AA1, the typical grayscale value of red subpixels R, the typical grayscale value of green subpixels G, and the typical grayscale value of blue subpixels B are calculated; in partition AA2, the typical grayscale value of red subpixels R, the typical grayscale value of green subpixels G, and the typical grayscale value of blue subpixels B are calculated;

and in partition AA3, the typical grayscale value of red subpixels R, the typical grayscale value of green subpixels G, and the typical grayscale value of blue subpixels B are calculated.

In S240, a common supply voltage corresponding to the subpixels emitting light having each color in each partition is determined according to the typical grayscale value.

Referring to FIG. 7, in partition AA1, the common supply voltage R_ELVSS1 corresponding to the red subpixels R is determined according to the typical grayscale value of the red subpixels R, the common supply voltage G_ELVSS1 corresponding to the green subpixels G is determined according to the typical grayscale value of the green subpixels G, and the common supply voltage B_ELVSS1 corresponding to the blue subpixels B is determined according to the typical grayscale value of the blue subpixels B.

In partition AA2, the common supply voltage R_ELVSS2 corresponding to the red subpixels R is determined according to the typical grayscale value of the red subpixels R, the common supply voltage G_ELVSS2 corresponding to the green subpixels G is determined according to the typical grayscale value of the green subpixels G, and the common supply voltage B_ELVSS2 corresponding to the blue subpixels B is determined according to the typical grayscale value of the blue subpixels B.

In partition AA3, the common supply voltage R_ELVSS3 corresponding to the red subpixels R is determined according to the typical grayscale value of the red subpixels R, the common supply voltage G_ELVSS3 corresponding to the green subpixels G is determined according to the typical grayscale value of the green subpixels G, and the common supply voltage B_ELVSS3 corresponding to the blue subpixels B is determined according to the typical grayscale value of the blue subpixels B.

In this embodiment of the present application, the frame may be partitioned, and the scheme of each preceding embodiment is used in each partition, facilitating a more precise common supply voltage.

Figure 8:
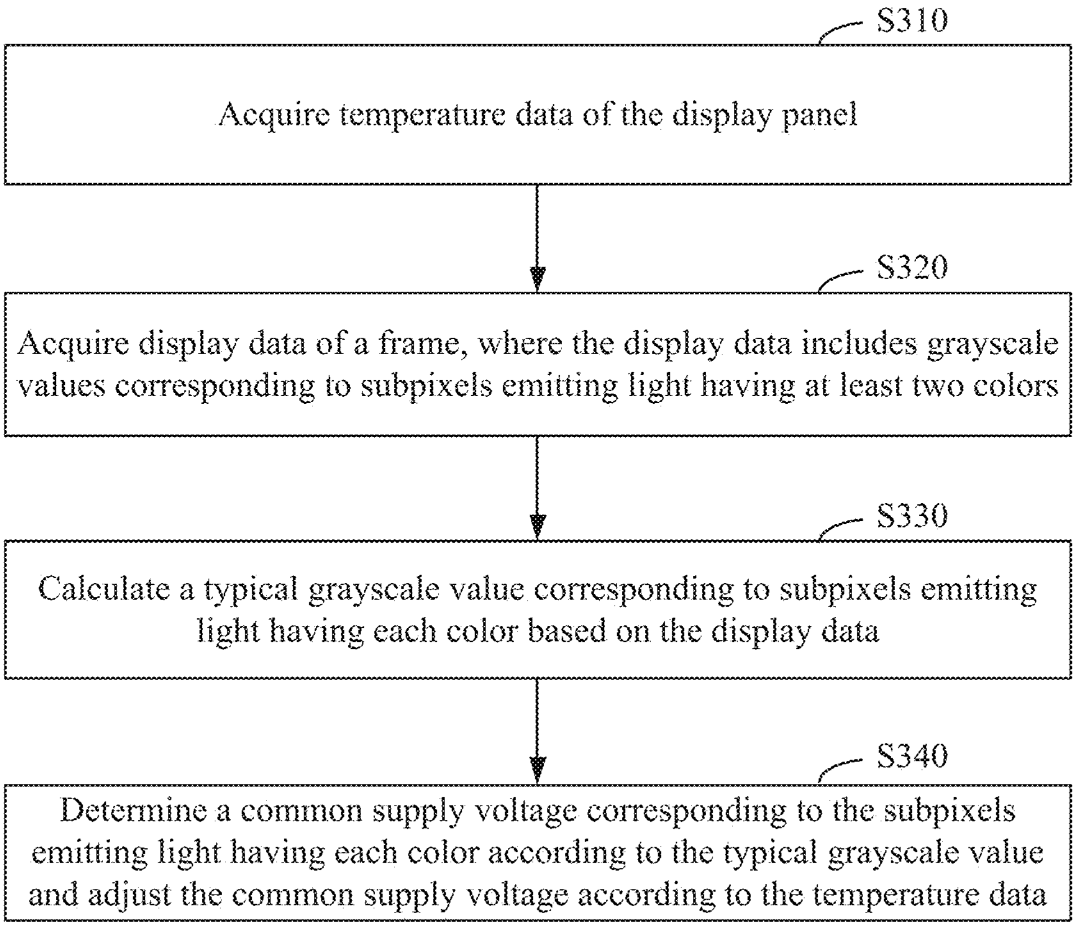
FIG. 8 is a flowchart of another driving method of the display panel according to embodiments of the present application.

Based on the preceding embodiments, the common supply voltage may be further adjusted according to temperature. FIG. 8 is a flowchart of another driving method of the display panel according to embodiments of the present application. Referring to FIG. 8, in an embodiment of the present application, alternatively, the driving method includes S310, S320, S330, and S340.

In S310, temperature data of the display panel is acquired.

Because temperature affects the luminous efficiency of a light-emitting element, the temperature data is acquired so that the common supply voltage can be controlled more precisely.

In S320, display data of a frame is acquired. The display data includes grayscale values corresponding to subpixels emitting light having at least two colors.

In S330, a typical grayscale value corresponding to subpixels emitting light having each color is calculated according to the display data.

In S340, a common supply voltage corresponding to the subpixels emitting light having each color is determined according to the typical grayscale value, and the common supply voltage is adjusted according to the temperature data.

The higher the temperature, the faster the aging speed of the light-emitting element, and the higher the absolute value of the common supply voltage requires to be adjusted to.

Alternatively, the adjustment may be made as follows: All temperature ranges of the display panel are classified into a plurality of temperature levels, and a voltage adjustment amount is matched according to the plurality of temperature levels; and a temperature level to which the temperature data belongs is determined according to the magnitude of the temperature data so that the common supply voltage is adjusted by using a voltage adjustment amount matching the temperature level.

In this embodiment of the present application, the common supply voltage is adjusted according to the temperature, facilitating the precision of the common supply voltage.

Embodiments of the present application also provide a driving apparatus of a display panel. The apparatus has a processor configured to execute the driving method of the display panel of any embodiment of the present application. The apparatus may be implemented by software and/or hardware and is built in a display device.

Figure 9:
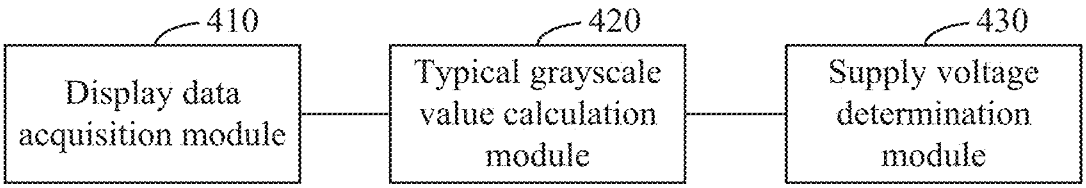
FIG. 9 is a diagram illustrating the structure of a driving apparatus of a display panel according to embodiments of the present application.

FIG. 9 is a diagram illustrating the structure of a driving apparatus of a display panel according to embodiments of the present application. Referring to FIG. 9, the apparatus includes a display data acquisition module 410, a typical grayscale value calculation module 420, and a supply voltage determination module 430. The display data acquisition module 410 is configured to acquire display data of a frame, and the display data includes grayscale values corresponding to subpixels emitting light having at least two colors. The typical grayscale value calculation module 420 is configured to calculate a typical grayscale value corresponding to subpixels emitting light having each color according to the display data. The supply voltage determination module 430 is configured to determine a common supply voltage corresponding to the subpixels emitting light having each color according to the typical grayscale value.

The driving apparatus of the display panel in this embodiment of the present application may execute the driving method of the display panel according to any embodiment of the present application and has function modules corresponding to the executed method.

Figure 10:
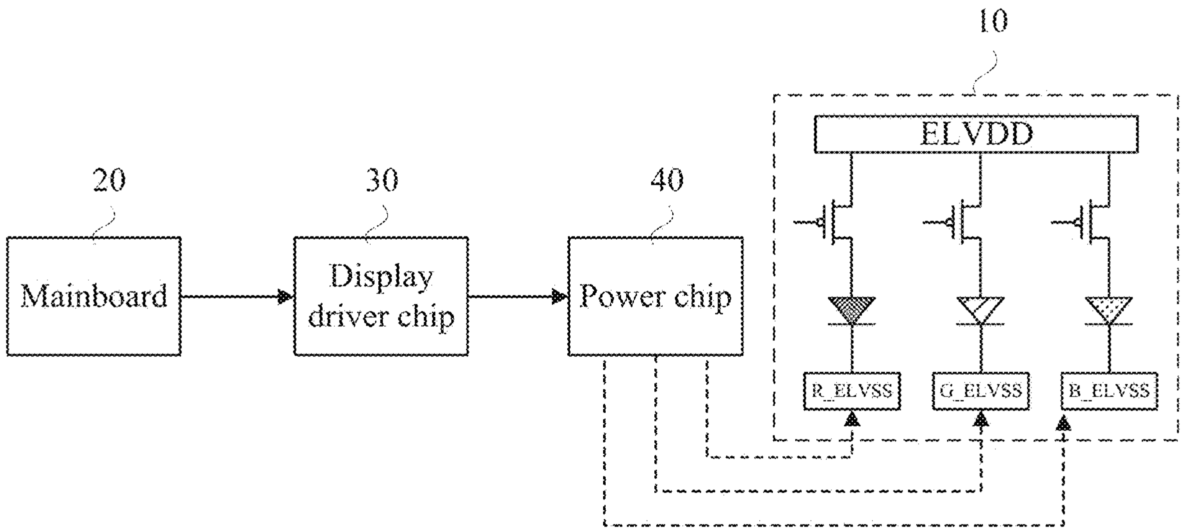
FIG. 10 is a diagram illustrating the structure of a display device according to embodiments of the present application.

Embodiments of the present application also provide a display device. FIG. 10 is a diagram illustrating the structure of a display device according to embodiments of the present application. Referring to FIG. 10, the display device includes a display panel 10, a mainboard 20, a display driver chip 30, and a power chip 40. The display driver chip 30 is configured to receive display data of a frame sent by the mainboard 20, execute the driving method of the display panel according to any embodiment of the present application, and generate a power control signal. The power chip 40 is configured to receive the power control signal sent by the display driver chip 30 and transmit a corresponding common supply voltage to the display panel 10.

For example, in a desktop computer, the mainboard 20 is installed in the host, and the host and the display panel 10 are connected by a data cable. The type of the data cable may be, for example, a High-Definition Multimedia Interface (HDMI) cable, a Video Graphics Array (VGA) cable, or a Digital Visual Interface (DVI) cable. For example, in a mobile phone, the mainboard 20 and the display panel 10 are both installed inside the mobile phone, and the mainboard 20 and the display panel 10 are connected by a built-in data cable.

The display device in this embodiment of the present application may execute the driving method of the display panel according to any embodiment of the present application.

It is to be understood that various forms of processes shown above may be adopted with steps reordered, added or deleted. For example, the steps described in the present application may be performed in parallel, sequentially or in different sequences.

What is claimed is:

1. A driving method of a display panel, comprising:

acquiring display data, having grayscale values corresponding to subpixels emitting light having at least two colors, of a frame;

calculating a typical grayscale value, representing a total grayscale level of subpixels emitting light having each of the at least two colors, corresponding to the subpixels emitting light having each of the at least two colors according to the display data; and determining a common supply voltage corresponding to the subpixels emitting light having each of the at least two colors according to the typical grayscale value;

wherein determining the common supply voltage corresponding to the subpixels emitting light having each of the at least two colors according to the typical grayscale value comprises:

classifying all grayscale values of the subpixels emitting light having each of the at least two colors into a plurality of grayscale levels, and matching a common supply voltage according to the plurality of grayscale levels to obtain a plurality of voltage levels; and determining, according to a magnitude of the typical grayscale value, a grayscale level to determine a corresponding voltage level, and the typical grayscale value belonging to the grayscale level.

2. The driving method according to claim 1, wherein the typical grayscale value comprises at least one of a maximum grayscale value, an arithmetic mean value, a weighted mean grayscale value, a median grayscale value, and a mode grayscale value.

3. The driving method according to claim 1, wherein the subpixels emitting light having the at least two colors comprise first-color subpixels, second-color subpixels, and third-color subpixels; and determining the common supply voltage corresponding to the subpixels emitting light having each of the at least two colors according to the typical grayscale value comprises:

classifying all grayscale values of the first-color subpixels into a plurality of first-color grayscale levels and matching a common supply voltage according to the plurality of first-color grayscale levels to obtain a plurality of first-color voltage levels; and determining, according to a magnitude of a typical grayscale value of the first-color subpixels, a first-color grayscale level to determine a first-color voltage level corresponding to the first-color subpixels, and the typical grayscale value of the first-color subpixels belonging to the first-color grayscale level;

classifying all grayscale values of the second-color subpixels into a plurality of second-color grayscale levels and matching a common supply voltage according to the plurality of second-color grayscale levels to obtain a plurality of second-color voltage levels; and determining, according to a magnitude of a typical grayscale value of the second-color subpixels, a second-color grayscale level to determine a second-color voltage level corresponding to the second-color subpixels, and the typical grayscale value of the second-color subpixels belonging to the second-color voltage level; and classifying all grayscale values of the third-color subpixels into a plurality of third-color grayscale levels and matching a common supply voltage according to the plurality of third-color grayscale levels to obtain a plurality of third-color voltage levels; and determining, according to a magnitude of a typical grayscale value of the third-color subpixels, a third-color grayscale level to determine a third-color voltage level corresponding to the third-color subpixels, and the typical grayscale value of the third-color subpixels belonging to the third-color grayscale level.

4. The driving method according to claim 3, wherein the first-color subpixels, the second-color subpixels, and the third-color subpixels are red subpixels, green subpixels, and blue subpixels respectively.

5. The driving method according to claim 1, wherein classifying all the grayscale values of the subpixels emitting light having each of the at least two colors into the plurality of grayscale levels comprises:

equally classifying all the grayscale values of the subpixels emitting light having each of the at least two colors to obtain the plurality of grayscale levels; or unequally classifying all the grayscale values of the subpixels emitting light having each of the at least two colors to obtain the plurality of grayscale levels.

6. The driving method according to claim 1, wherein grayscale levels and voltage levels corresponding to the subpixels emitting light having each of the at least two colors are stored in a grayscale-voltage table, and a voltage level corresponding to subpixels emitting light having one of the at least two colors is determined in the following manner: the grayscale-voltage table is queried by using a typical grayscale value of the subpixels emitting light having the one of the at least two colors as an index.

7. The driving method according to claim 6, wherein the subpixels emitting light having the at least two colors comprise first-color subpixels, second-color subpixels, and third-color subpixels; and the grayscale-voltage table is configured to be queried for a first-color grayscale level and a first-color voltage level corresponding to the first-color subpixels, a second-color grayscale level and a second-color voltage level corresponding to the second-color subpixels, and a third-color grayscale level and a third-color voltage level corresponding to the third-color subpixels.

8. The driving method according to claim 6, wherein a larger number of the grayscale levels and the voltage levels corresponds to a more precise determined common supply voltage corresponding to the subpixels emitting light having each of the at least two colors, and corresponds to a larger system memory occupied by the grayscale-voltage table.

9. The driving method according to claim 1, wherein a higher grayscale value corresponds to a higher grayscale level, the higher grayscale level corresponds to a higher voltage level, and the higher voltage level corresponds to a higher absolute value of a common supply voltage.

10. The driving method according to claim 1, wherein the subpixels emitting light having the at least two colors comprise red subpixels, green subpixels, and blue subpixels; and voltage levels of the subpixels emitting light having the at least two colors are classified in a same manner, wherein at a same voltage level of the voltage levels, a common supply voltage of the red subpixels is R_COM, a common supply voltage of the green subpixels is G_COM, and a common supply voltage of the blue subpixels is B_COM, wherein $|R\_COM| \le |G\_COM| \le |B\_COM|$.

11. The driving method according to claim 1, wherein determining the common supply voltage corresponding to the subpixels emitting light having each of the at least two colors according to the typical grayscale value comprises:

establishing a mathematical expression of the typical grayscale value and the common supply voltage for the subpixels emitting light having each of the at least two colors; and substituting the typical grayscale value into the mathematical expression to obtain the common supply voltage for the subpixels emitting light having each of the at least two colors respectively.

12. The driving method according to claim 1, before calculating the typical grayscale value corresponding to the subpixels emitting light having each of the at least two colors according to the display data, the method further comprising:

partitioning the frame to obtain at least two partitions.

13. The driving method according to claim 12, wherein determining the common supply voltage further comprises:

calculating, according to the display data, a typical grayscale value corresponding to subpixels emitting light having each of the at least two colors in each of the at least two partitions; and determining a common supply voltage corresponding to the subpixels emitting light having each of the at least two colors in each of the at least two partitions according to the typical grayscale value.

14. The driving method according to claim 1, before determining the common supply voltage corresponding to the subpixels emitting light having each of the at least two colors according to the typical grayscale value, the method further comprising:

acquiring temperature data of the display panel.

15. The driving method according to claim 14, wherein determining the common supply voltage comprises:

adjusting the common supply voltage according to the temperature data.

16. The driving method according to claim 15, wherein adjusting the common supply voltage according to the temperature data comprises:

classifying all temperature ranges of the display panel into a plurality of temperature levels and matching a voltage adjustment amount according to the plurality of temperature levels; and determining a temperature level according to a magnitude of the temperature data and adjusting the common supply voltage by using a voltage adjustment amount matching the temperature level, and the temperature data belonging to the temperature level.

17. The driving method according to claim 16, wherein the higher the temperature level, the higher an absolute value of the common supply voltage.

18. A display device, comprising a display panel, a mainboard, a display driver chip, and a power chip, wherein the display driver chip is configured to receive display data of a frame sent by the mainboard, execute the driving method of the display panel according to claim 1, and generate a power control signal; and the power chip is configured to receive the power control signal sent by the display driver chip and transmit the common supply voltage of the subpixels emitting light having each of the at least two colors to the display panel.

19. A driving apparatus of a display panel, comprising:

a processor configured to acquire display data, having grayscale values corresponding to subpixels emitting light having at least two colors, of one frame;

the processor further configured to calculate a typical grayscale value corresponding to subpixels emitting light having each of the at least two colors according to the display data; and the processor further configured to determine a common supply voltage corresponding to the subpixels emitting light having each of the at least two colors according to the typical grayscale value;

wherein determining the common supply voltage corresponding to the subpixels emitting light having each of the at least two colors according to the typical grayscale value comprises:

classifying all grayscale values of the subpixels emitting light having each of the at least two colors into a plurality of grayscale levels, and matching a common supply voltage according to the plurality of grayscale levels to obtain a plurality of voltage levels; and determining, according to a magnitude of the typical grayscale value, a grayscale level to determine a corresponding voltage level, and the typical grayscale value belonging to the grayscale level.

* * * * *